R. MEISTER.
ROTATORY TUBULAR HEATING BODY FOR TROUGH DRIERS.
APPLICATION FILED JULY 11, 1912.
1,064,664.
Patented June 10, 1913.
2 SHEETS—SHEET 1.
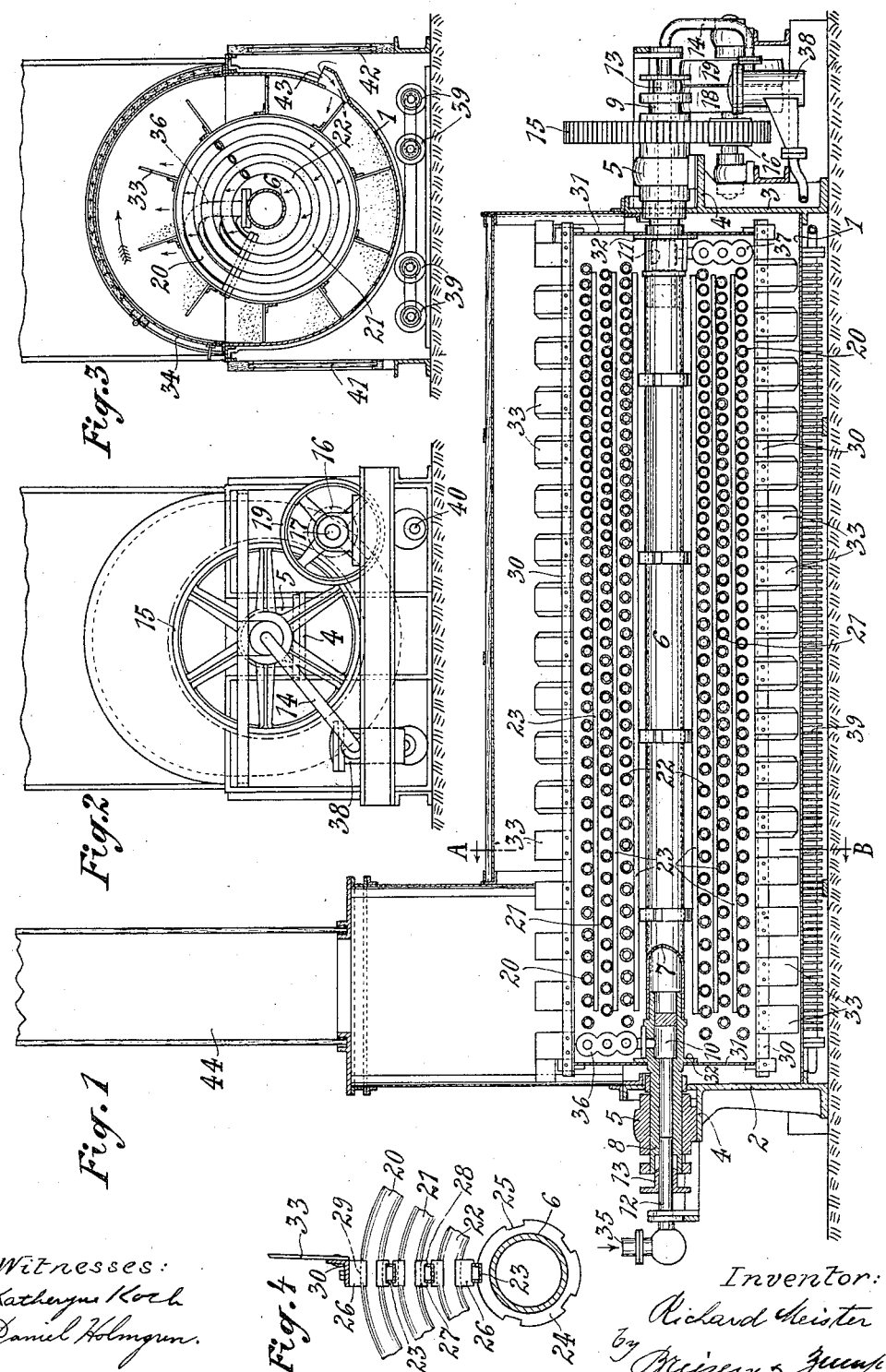

R. MEISTER.
ROTATORY TUBULAR HEATING BODY FOR TROUGH DRIERS.
APPLICATION FILED JULY 11, 1912.
1,064,664.
Patented June 10, 1913.
2 SHEETS—SHEET 2.
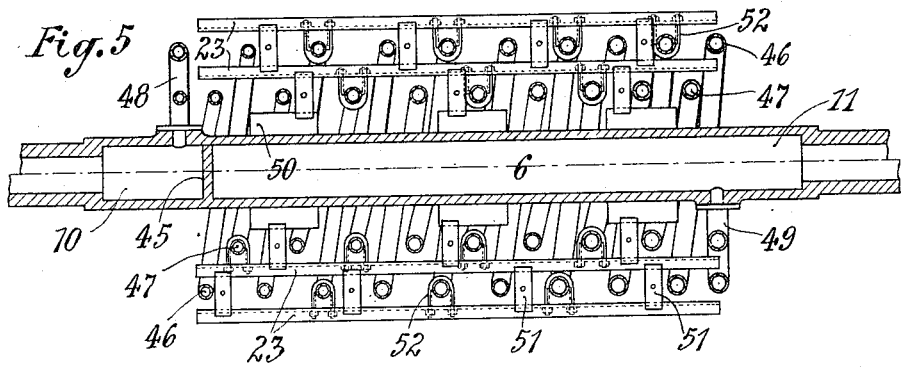
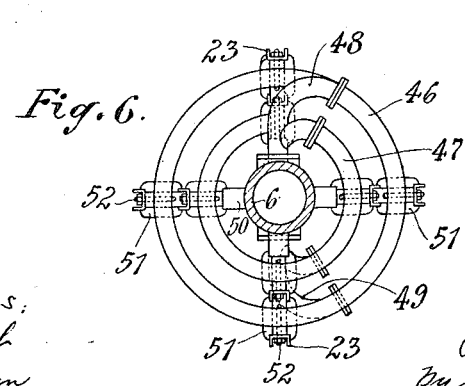
Witnesses:
Katherine Koch
Daniel Holmgren
Inventor:
Richard Meister

UNITED STATES PATENT OFFICE.

RICHARD MEISTER, OF MEERANE, GERMANY, ASSIGNOR TO THE FIRM PHÖNIX-WERK G. M. B. H., SPECIALFABRIK MODERNER TROCKENAPPARATE, OF MEERANE, GERMANY.

ROTATORY TUBULAR HEATING-BODY FOR TROUGH-DRIERS.

1,064,664.     Specification of Letters Patent.     Patented June 10, 1913.

Application filed July 11, 1912. Serial No. 708,869.

*To all whom it may concern:*

Be it known that I, RICHARD MEISTER, a subject of the King of Saxony, residing at Meerane, in the Kingdom of Saxony, Empire of Germany, engineer, have invented certain new and useful Improvements in Rotatory Tubular Heating-Bodies for Trough-Driers; and I do hereby declare the following to be a full, clear, and exact description of the invention, such as will enable others skilled in the art to which it appertains to make and use the same.

The rotatory tubular heating-bodies or drums for trough-driers usually consist of straight tubes the ends of which are secured in disk-shaped walls terminating the inlet- and outlet-chambers of the heating-medium, usually steam. The ends of said tubes are generally secured in said walls by expanding them in the well known manner.

Tubular heating-bodies or drums of this kind do, however, not give general satisfaction, because of the many leakages at the places where the ends of said tubes are secured in said walls by expanding or screwing-in. These leakages are generally taking place on account of the different coefficients of contraction or expansion.

The object of my present invention is, to provide a tubular heating-body for trough-driers by means of which not only the above-named drawbacks will be avoided, but also new advantages gained. To this end I provide a tubular heating-body, the shaft of which is surrounded by screw-thread or serpentine shaped heating-tubes, called in the following "serpentines", which are connected at the one end with one of the tubular journals or recessed ends of the shaft and at the other end with the other tubular journal or recessed end of said shaft. Said tubular journals or recesses form the inlet- and outlet-chambers for the heating-medium respectively.

If the whole tubular heating-body were made of a single tube the way of the heating-medium would be too long and instead of heating at the latter end of its way it might perform a cooling action instead. To avoid this, my heating-body is composed of several serpentines of different diameters and arranged concentric to the shaft of the heating-body *i. e.* parallel to each other. Each of these serpentines receives its own supply of heating-medium. To shorten the way of the heating-medium further still, each of said serpentines of the heating-body may be made to consist again of two or more parts of which each is separately fed by the heating-medium, to which end I employ so called tube-bridges. The heating-capacity of the heating body is thus increased very considerably. To shorten the way of the heating-medium I even may employ two or more serpentines of the same diameter and arrange them after the manner of threads on a multithreaded bolt or screw.

The material to be dried enters the trough-drier where the heating-medium enters the latter, and leaves it at the other end. But since this is wet or very damp and therefore clumpy it needs considerable more space to pass through the serpentine heating-body at the entrance-end of the trough-drier than at the outlet-end thereof, where the material has already attained a condition which permits it to flow readily through smaller spaces. This fact permits of increasing the heating-surface of the serpentines toward the outlet-end of the trough-drier by arranging the windings of the serpentines closer together. This I may also accomplish by employing tubes of different diameters in each serpentine and arrange them in such a manner, that the tube of the smallest diameter lies near the inlet-chamber of the heating-medium and the tube of the greatest diameter near the outlet-chamber of the heating-medium.

Based upon the fact that the material is bulkier where it enters the trough than where it leaves the latter I construct each serpentine in such a manner that the interstices between adjacent windings thereof are wide at the inlet-end of the trough-drier and smaller at the outlet-end thereof. This can of course be obtained by diminishing the angle of inclination of pitch of the windings of the serpentines from the inlet-end toward the outlet-end of said trough-drier. This would, however, render the manufacture of the serpentines very laborious and expensive wherefore it is advisable to build-up each serpentine of a number of more or less lengthy divisions of which each is composed of a different number of windings. This answers all practical purposes and the serpentines can be readily and cheaply manufactured.

The concentric arrangement of the several serpentines to the axis of rotation must of course be executed in such a manner that shaft and serpentines form a rigid body adapted to not only withstand the wear and tear of the work but also rotate without jerks when run at higher speeds.

The new tubular heating-body may not only be employed for drying brewery-wastes and the like, but may as well be advantageously employed for drying any other materials permitting of being dried by means of a rotatory tubular heating-body.

In the accompanying drawings: Figure 1 is a longitudinal sectional view of a trough-drier provided with a rotatory-tubular heating-body constructed in acordance with my present invention. Fig. 2 is a rear-end elevation of the trough-drier. Fig. 3 is a sectional view taken on line A—B of Fig. 1. Fig. 4 is a detail-view of the staying-means employed for rigidly connecting the serpentines with the shaft of the heating-body and with the shovel-carriers of a stirrer. Fig. 5 is a longitudinal sectional view of a modification of the heating-body, showing stays of a somewhat different construction. Fig. 6 is an end-view of the heating-body shown in Fig. 5.

The trough 1 is closed at its ends by the walls 2 and 3 of which each is provided with a bracket 4 for the support of a bearing-box 5, in which the main-shaft 6 is journaled. The latter consists in Fig. 1 of a drawn tube 7 which is provided with the tubular journals 8 and 9, of which the former is recessed to form the inlet-chamber 10, whereas the journal 9 is similarly recessed to form the outlet-chamber 11. The feed-pipe 12 is introduced into the journal 8 and kept steam-tight by means of the stuffing-box 13. In exactly the same manner the outlet-pipe 14 is connected with the journal 9, which bears the wheel 15 driven by the pinion 16. The latter is seated upon the counter-shaft 17 provided with the usual fast and loose pulleys 18 and 19.

Around the shaft are arranged the serpentines 20, 21 and 22 parallel to each other and concentric to said shaft and are carried by a number of U-shaped braces 23. Upon the shaft 6 are seated several rings 24 provided with a series of recesses 25 each. The innermost braces are resting in said recesses and in turn serve to retain blocks 26 which straddle said braces with their flat bottom-side and are prevented from leaving their seats by means of the lateral lips 27 and 28. The curved face 29 of each block serves for the reception of one of the windings of the serpentine 22. In a similar manner the serpentines 21 and 20 are braced, so that the shaft, braces, serpentines and shovel-carriers 30 form a single rigid body. The latter are carried by and secured to the disks 31 which are connected to the flanges 32 of the journals 8 and 9 respectively. Supposing now the material to be thrown into the trough by the aid of a hopper or any other known means (not shown) employed by the art for such purposes. Upon entering the trough the material will be taken-hold of by the shovels 33 and agitated in the usual manner and will thus be compelled to come again and again into contact with the serpentines 20–22. Since the latter are formed after the manner of screw-threads, the material will gradually move toward the opposite end of the trough. During this advance of the material the latter is dried and can finally be removed from the drier through the door 34.

The drying-medium, usually steam, enters by 35 into the pipe 12, penetrates into the inlet-chamber 10 and enters the branched head 36, to which, as shown in Fig. 3, the serpentines 20, 21 and 22 are connected. The steam is of course here the hottest and therefore acts most energetically upon the wet or moist material. In the proportion the drying of the material progresses it is reduced in bulk and according to this bodily change the material has less difficulties in finding its way through the gradually narrowing interstices of the heating-body. The steam, after flowing separately through the three serpentines, mingles again upon entering the branched head 37 from which it flows into the outlet-chamber 11 and thence by way of the outlet-pipe 14 into the steam-trap 38. From here the remainder of the steam is directed into the ribbed heating-coil 39, which it leaves at 40 (Fig. 2) after having imparted to the trough all or nearly all of its heat. In doing so the trough is heated to a certain extent from the outside. The heated air surrounding the trough between the removable walls 41 and 42 (Fig. 3) enters the trough by the lateral inlet 43 and aids in drying the material, to pass finally off into the chimney 44 commingled with any dust the material may form during the drying-operation. For smaller driers it is preferred to make the main-shaft of cast-iron, as indicated in Figs. 5 and 6. In these modifications of my invention the inlet- and outlet-chambers 10 and 11 are separated by a division-wall 45. In this modification the same characteristics will be noticed as already pointed out in connection with the tubular drying-body shown in Fig. 1, namely, that the several serpentines are arranged parallel to each other and that the width of interstices between the windings of each serpentine decreases from the inlet-chamber toward the outlet-chamber. In Fig. 5 it will, however, be observed, that each serpentine has a smaller tube-diameter at the one end than at the other. This is advantageous for two reasons, because on the one hand it helps to secure a wider space between adjacent serpentine-windings at the steam inlet-end than at the steam outlet-end, and on the other hand the heating-surface of the serpentines is gradually increased toward the outlet-chamber 11. Besides this it permits of giving the windings of the serpentine throughout the whole length of the latter the same pitch and yet vary the interstices so that they diminish in width from the steam inlet-chamber toward the steam outlet-chamber, as will be clear without further comment. In this figure the serpentines 46 and 47 are attached to the branch-pipe 48 communicating with the inlet-chamber 10, and also connected with the branch-pipe 49 communicating with the outlet-chamber 11. The formation of the stays differs here in some respects from the one shown in Fig. 4, inasmuch as the rings 24 are replaced by the wings 50 cast integrally with said shaft, whereas the place of the blocks 26 is taken by the clamps 51 and the U-shaped bolts 52, as clearly shown in Fig. 5. An end-view of this modification of the tubular heating-body is shown in Fig. 6.

I claim:—

1. A rotatory tubular heating-body of the character described, comprising a shaft, a steam inlet-chamber arranged in one end of said shaft, a steam outlet-chamber arranged in the other end of said shaft, a series of serpentines encircling said shaft, a multibranched head for connecting the one end of said serpentines with said inlet-chamber, and another multibranched-head for connecting the other end of said serpentines with said outlet-chamber.

2. A rotary drier comprising a stationary housing, a shaft journaled therein, a steam inlet chamber formed within said shaft at one end thereof, a steam outlet chamber formed within the shaft at the other end thereof, and a series of coiled tubes encircling the shaft and communicating with said inlet and outlet chambers, the free space between the tube-coils diminishing from the inlet chamber toward the outlet chamber.

3. A rotatory tubular heating-body of the character described, consisting of a shaft, a steam inlet-chamber in said shaft, a steam outlet-chamber also provided in said shaft, and a series of serpentines communicating with said chambers and provided with windings the angle of inclination of which decreases in the direction from the steam inlet-chamber toward the steam outlet-chamber.

4. In a rotatory tubular heating-body of the character described the combination of a shaft, a steam inlet-chamber provided in said shaft, a steam outlet-chamber also arranged in said shaft, a plurality of serpentines, braces arranged between said serpentines parallel to the axis of rotation, and staying means for rigidly connecting said serpentines with each other and with said shaft and retaining them concentric to the latter.

5. The combination of a rotatory tubular heating-body of the character described with the stirrer of a trough-drier comprising a shaft, a steam inlet-chamber arranged in said shaft, a steam outlet-chamber likewise arranged in said shaft, a series of serpentines encircling said shaft and communicating with said chambers, shovel-carriers provided with a series of shovels each, supports secured to said shaft and supporting said shovel-carriers, braces arranged between said serpentines parallel to the axis of rotation, and staying-means for rigidly connecting said shaft, braces, serpentines and shovel-carriers.

Signed by me Chemnitz, Sa. at this 28th day of June 1912.

RICHARD MEISTER.

Witnesses:
SIDNEY RICH,
M. F. BENNDORF.